United States Patent [19]
Tanaka et al.

[11] Patent Number: 5,914,544
[45] Date of Patent: Jun. 22, 1999

[54] HIGH-FREQUENCY SWITCHING CIRCUIT

[75] Inventors: Sadanori Tanaka; Hajime Iwatsuki; Takao Chono, all of Sapporo, Japan

[73] Assignee: Fujitsu Limited, Kanagawa, Japan

[21] Appl. No.: 08/956,554

[22] Filed: Oct. 23, 1997

[30] Foreign Application Priority Data

May 2, 1997 [JP] Japan ..................................... 9-114809

[51] Int. Cl.$^6$ ................................................. H03G 11/04
[52] U.S. Cl. ........................... 307/130; 343/741; 333/132; 333/262; 327/113; 455/199.1
[58] Field of Search ..................... 307/130, 140, 307/415, 139; 343/741; 333/262, 132; 327/113; 455/199.1

[56] References Cited

U.S. PATENT DOCUMENTS

| | | | |
|---|---|---|---|
| 4,417,153 | 11/1983 | Onodera et al. | 307/140 |
| 4,443,844 | 4/1984 | Grace | 363/132 |
| 5,300,900 | 4/1994 | Bellantoni | 333/262 |
| 5,634,200 | 5/1997 | Kitakubo et al. | 455/82 |

FOREIGN PATENT DOCUMENTS 07074672  3/1995  Japan .

*Primary Examiner*—Albert W. Paladini
*Attorney, Agent, or Firm*—Helfgott & Karas, P.C.

[57] ABSTRACT

The present invention relates to a high-frequency switching circuit, and provides a high-frequency switching circuit capable of withstanding high output power, achieving highly efficient isolation, and reducing an insertion loss using inexpensive pin diodes. A switching control voltage or ground voltage developed at one power supply is applied to a control terminal. A diode resonant circuit includes a diode that applies a signal to an output terminal through an anode thereof and a signal to an input terminal through a cathode thereof, and has a resonant circuit, which attains a parallel resonance owing to a parasitic capacitance formed when the diode is off in the frequency band of the high-frequency signal, interposed between the anode and cathode of the diode. A first bias circuit separates a switching control current stemming from the switching control voltage applied to the control terminal from the high-frequency signal and supplies the switching control current to the anode of the diode. A second bias circuit causes a switching control current supplied to the cathode of the diode and separated from the high-frequency signal to flow to ground.

18 Claims, 11 Drawing Sheets

HIGH-FREQUENCY SWITCHING CIRCUIT

BACKGROUND OF THE INVENTION

1. Field of the Invention

The present invention relates to a high-frequency switch, or more particularly, to a high-frequency switch employed in a communication equipment to be installed in a base station for telephony using digital portable telephones or personal handy phones (PHSs).

2. Description of the Related Art

In recent years, the importance of a shared antenna switch has attracted attention along with the prevalence of digital mobile communication equipment employed in a base station or the like for telephony using digital portable telephones or PHSs. The shared antenna switch selectively connects a plurality of antennas by controlling switch selection.

As the shared antenna switch, a high-frequency multi-branch switch using pin diodes or high-frequency relays is used in general. Not only a requirement for a compact design and a high performance but various other requirements have been made for the high-frequency multi-branch switch. Specifically, it is required improve a distortion characteristic relative to a high output, minimize a loss, achieve highly efficient isolation, and reduce the cost for the purpose of coping with a multi-branch switch configuration for meeting the demand for an increase in the number of transmission/reception channels at a mobile communication base station and in transmission power and with an antenna switching diversity system.

When a high-output power amplifier is connected to a conventional high-frequency multi-branch switch, the problems below occur.

When high-frequency relays that are mechanical switches are used for a high-frequency multi-branch switch, high performance is ensured in terms of the abilities to withstand high power, suppress distortion, minimize a loss, and achieve highly efficient isolation. However, there arise problems that the circuit scale (shape) becomes large and the switching speed of the switch is low.

When pin diodes are used for a high-frequency multi-branch switch, a pin diode designed for high output power is included. A parasitic capacitance in the pin diode cannot be ignored from the viewpoint of the flow of a high-frequency current. This poses a problem that isolation efficiency deteriorates and insertion loss increases.

SUMMARY OF THE INVENTION

Accordingly, an object of the present invention is to provide a simple high-frequency switching circuit configuration using pin diodes, and to provide a high-frequency switching circuit capable of achieving highly efficient isolation and low insertion loss so as to cope with high output power despite the configuration using inexpensive pin diodes.

According to the present invention, there is provided a high-frequency switching circuit of a single-pole double-throw type having one input terminal through which a high-frequency signal is input and first and second output terminals through either of which the input high-frequency signal is output. The high-frequency switching circuit comprises a first control terminal to which a switching control voltage or ground voltage developed at one power supply is applied, a second control terminal to which a ground voltage or switching control voltage that is opposite in polarity to the voltage applied to the first control terminal is applied, a first diode having a high-frequency signal input through the input terminal applied through an anode thereof and applying a signal to the first output terminal through a cathode thereof, a second diode having the high-frequency signal input through the input terminal through a cathode thereof and applying a signal to the second output terminal through an anode thereof, a first bias circuit for separating a switching control current stemming from the switching control voltage applied to the first control circuit from the high-frequency signal, and supplying the switching control current to the cathode of the first diode and the anode of the second diode, and a second bias circuit for separating a switching control current stemming from the switching control voltage applied to the second control terminal from the high-frequency signal and supplying the switching control current to the anode of the first diode and the cathode of the second diode.

The high-frequency switching circuit further comprises a first bypass circuit including a third diode whose anode is connected to the cathode of the first diode and whose cathode is bypassed to the ground for shunting the path of an alternating current, and a second bypass circuit including a fourth diode whose cathode is connected to the anode of the second diode and whose anode is bypassed to the ground for shunting the path of an alternating current:. A switching control current is supplied from the second bypass circuit to the cathode of the third diode and the anode of the fourth diode.

According to the present invention, there is provided a high-frequency switching circuit having an input terminal through which a high-frequency signal is input and an output terminal through which the input high-frequency signal is output. The high-frequency switching circuit comprises a control terminal to which a switching control voltage or ground voltage developed at one power supply is applied, a diode resonant circuit including a diode for applying a signal to the output terminal through an anode thereof and a signal to the input terminal through a cathode thereof, and having a resonant circuit, which attains a parallel resonance in cooperation with a parasitic capacitance formed when the diode is turned off in the frequency band of the high-frequency signal, interposed between the anode and cathode, a first bias circuit for separating a switching control current stemming from the switching control voltage applied to the control terminal from the high-frequency signal and supplying the switching control current to the anode of the diode, and a second bypass circuit for causing the switching control current supplied to the cathode of the diode and separated from the high-frequency signal to flow to ground.

There is also provided a multi-branch switch configuration including a plurality of high-frequency switching/branching devices each comprising a control terminal portion to which a switching control voltage or ground voltage developed at one power supply is applied, a diode resonant circuit portion including a diode for supplying a signal to the output terminal through an anode thereof and a signal to the anode of the diode included in the diode resonant circuit through a cathode thereof, and having a resonant circuit, which attains a parallel resonance in cooperation with a parasitic capacitance formed when the diode is turned off in the frequency band of the high-frequency signal, interposed between the anode and cathode of the diode, and a first bias circuit portion for separating a switching control current stemming from the switching control voltage applied to the control terminal from the high-frequency signal and supplying the switching control current to the anode of the diode.

Furthermore, according to the present invention, a phase adjustment circuit for compensating for a phase difference so that when the diode is off, the path reaching the output terminal is open for the high-frequency signal, is interposed between the input terminal and the cathode of the diode included in the diode resonant circuit.

BRIEF DESCRIPTION OF THE DRAWINGS

The present invention will be more clearly understood from the description as set forth below with reference to the accompanying drawings.

FIG. 5A is a diagram showing the results of simulation concerning a frequency transfer/passage characteristic and reflection characteristic of the circuit, shown in FIG. 4, which is on;

FIG. 5B is a Smith chart showing input and output reflection characteristics of the circuit shown in FIG. 4 which is on;

FIG. 8A is a diagram showing the results of simulation concerning the frequency transfer/passage characteristic and reflection characteristic of the circuit shown in FIG. 7 which is on;

FIG. 8B is a Smith chart showing the input and output reflection characteristics of the circuit shown in FIG. 7 which is on;

DESCRIPTION OF THE PREFERRED EMBODIMENTS

Before the present invention is described, a related conventional high-frequency switching circuit using pin diodes will be outlined below.

Figure 1A:
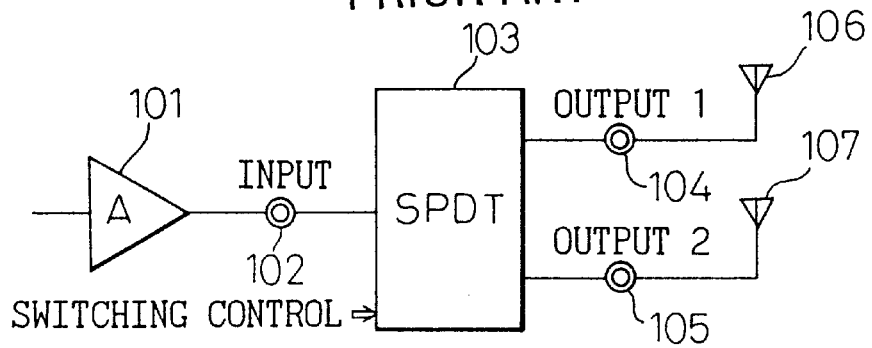
FIG. 1A is a diagram showing an applied example of a conventional high-frequency switching circuit of a single-pole double-throw (SPDT) type using pin diodes.
Figure 1B:
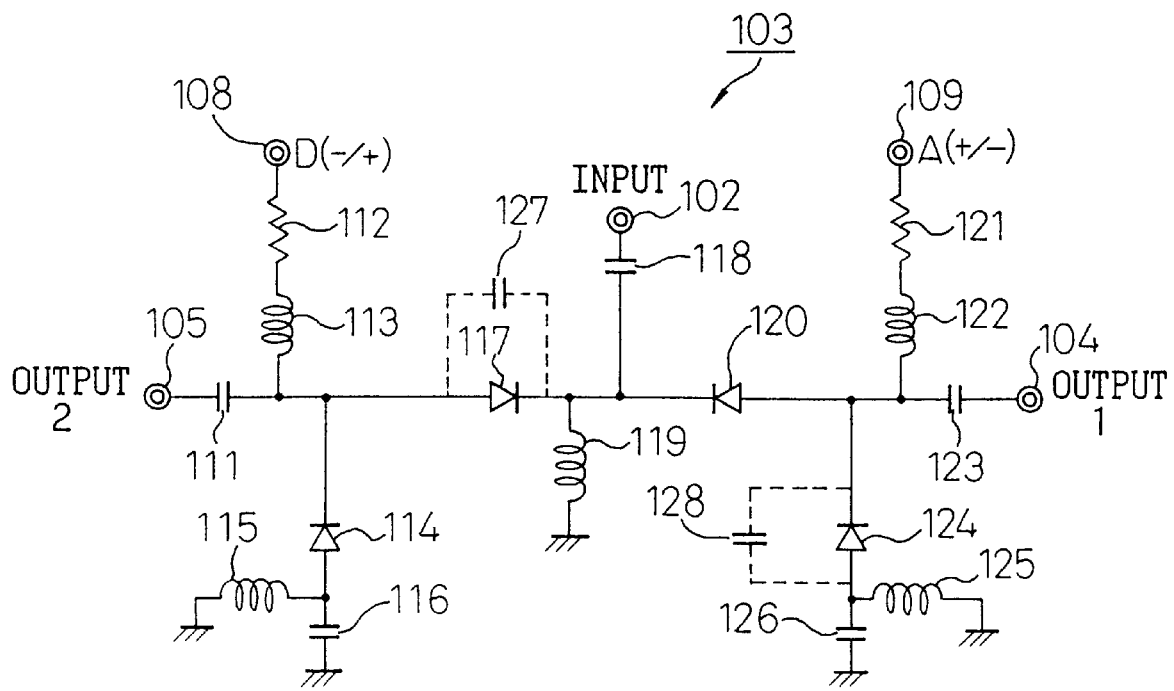
FIG. 1B is a diagram showing an example of the circuitry of the high-frequency switching circuit of a SPDT type shown in FIG. 1A.

FIGS. 1A and 1B show an example of a conventional high-frequency switching circuit using a single-pole double-throw (SPDT) composed of pin diodes. FIG. 1A is a block diagram showing a use example, and FIG. 1B shows an example of the SPDT circuit.

In FIG. 1A, an output signal of a power amplifier 101 is applied to an input terminal 102 of an SPDT 103. The SPDT 103 selects either of an output terminal (1) 104 and output terminal (2) 105 according to a switching control signal applied externally and makes a through connection between the input terminal 102 and the selected output terminal. As a result, the output signal is output through an antenna 106 or 107 connected to the selected output terminal.

FIG. 1B shows an example of the circuitry of the SPDT 103. This example will be described on the assumption that the input terminal 102 is connected to the output terminal (1) 104. A positive voltage (+) is applied to a control terminal (A) 109, and a negative voltage (−) is applied to a control terminal (D) 108.

In this case, a switching control current (dc bias current) flows from the control terminal (A) 109 into a resistor 121, inductor 122, pin diode 120, and an inductor 119 in that order. A low impedance is produced between the anode and cathode of the forward-biased pin diode 120. This causes the path linking the input terminal 102 and output terminal (1) 104 to conduct. The resistor 121 determines the switching control current, and the inductors 122 and 119 are choke coils for separating a dc line from a high-frequency signal line.

A pin diode 117 is reverse-biased by the negative voltage (−) applied to the control terminal (D) 108 and turned off. This causes the path linking the input terminal 102 and output terminal 105 to open. The negative voltage causes a direct current to flow into an inductor 115, pin diode 114, inductor 113, and resistor 112 in that order. The forward-biased pin diode 114 becomes conducting. The resistor 112 determines the direct current, and the inductors 113 and 115 are choke coils for separating a dc line from a high-frequency signal line.

The anode of the pin diode 114 is grounded via a capacitor 116 to provide a return path for an alternating current. As a result, a high-frequency component leaking via a parasitic capacitor 127 formed when the pin diode 117 is turned off is removed, and the efficiency of isolation between the output terminal (1) 104 and output terminal (2) 105 is improved. A pin diode 124 connected on the path reaching the output terminal (1) 104 is reverse-biased by the positive voltage applied to the control terminal (A) 109 and becomes open, whereby a load loss suffered by a high-frequency signal during passage through the path reaching the output terminal is prevented. However, when a high output power amplifier is connected on an input state, such problems as (1) the parasitic capacitor 127 of the pin diode that is turned off provides a large capacitance to disable efficient isolation, and (2) the loss suffered by a signal, during passage through the parasitic capacitor 128 of the pin diode 124 that is turned off, increases, cannot be said to be solved completely.

Figure 2A:
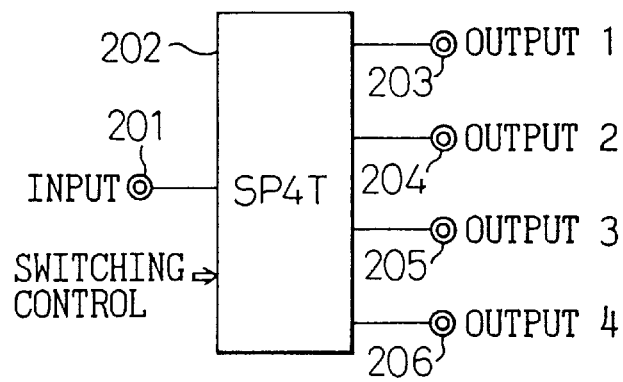
FIG. 2A is a diagram showing an applied example of a conventional high-frequency switching circuit of a single-pole four-throw (SP4T) type using pin diodes.
Figure 2B:
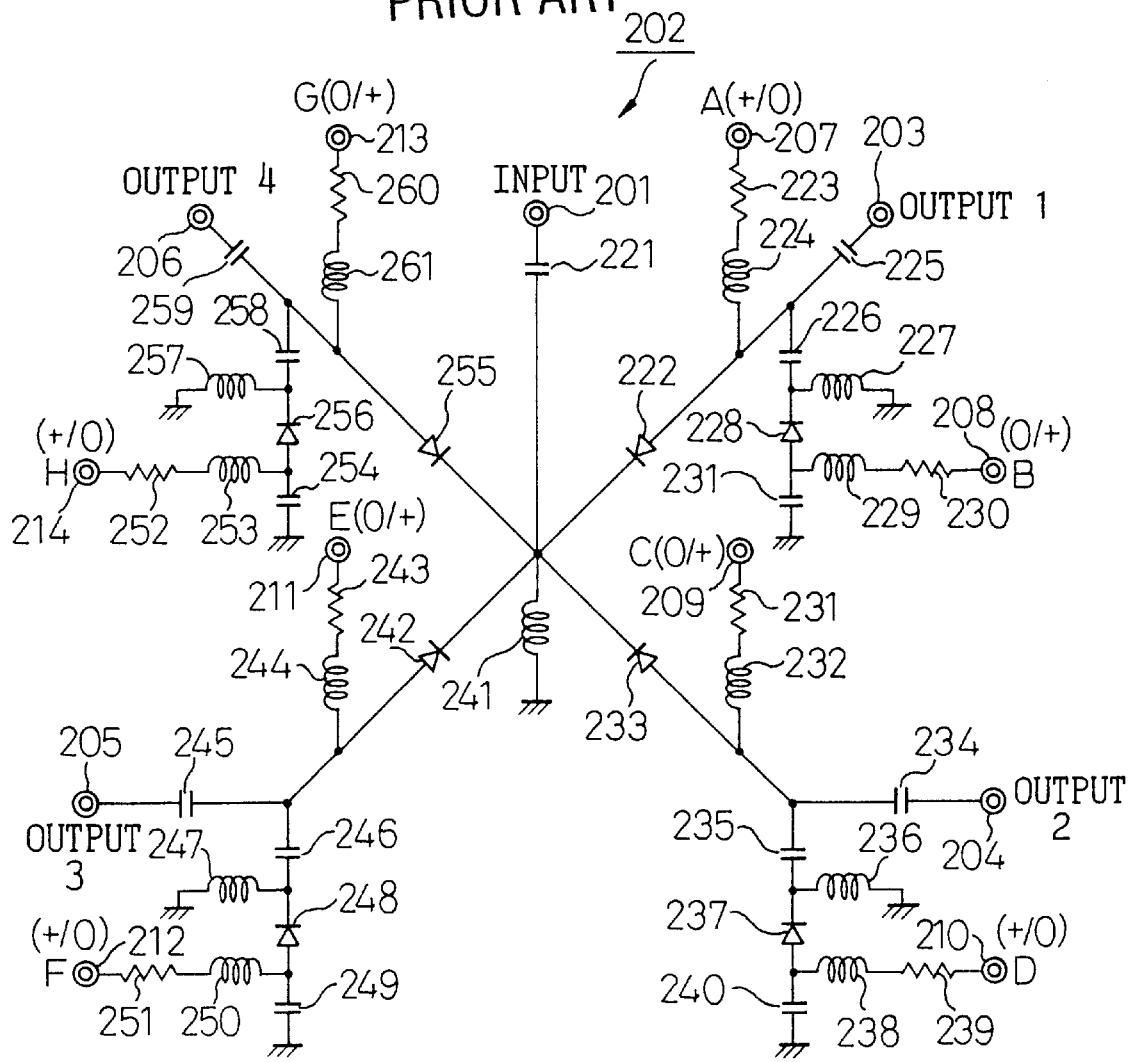
FIG. 2B is a diagram showing an example of the circuitry of the high-frequency switching circuit of an SP4T type shown in FIG. 2A.

FIGS. 2A and 2B show an example of a conventional mechanical high-frequency switching circuit of a single-pole four-throw (SP4T) type using pin diodes. FIG. 2A is a block diagram of the circuit, and FIG. 2B shows an example of the circuitry of the SP4T.

FIG. 2B is a circuit diagram of an SP4T 202 shown in FIG. 2A, wherein a high-frequency signal input through an input terminal 201 is output through an output terminal (1) 203. In this case, a positive voltage (+) is applied to a control terminal (A) 207 and a ground voltage (0) is applied to a control terminal (B) 208. A switching control current flows Into a resistor 223, inductor 224, pin diode 22, and inductor 241 in that order. The forward-biased pin diode 222 becomes conducting. A pin diode 228 is reverse-biased and turned off. As a result, a high-frequency signal input through the input terminal 201 is output through the output terminal 203 via a capacitor 221 for blocking the flow of a direct current, a pin diode 22, and a capacitor 225 for blocking the flow of a direct current.

As for the other output terminals (2 to 4) 204 to 206, a ground voltage (0) is applied to one switching control terminals (C, E, G) 209, 211, and 213, and a positive voltage (+) is applied to the other control terminals (D, F, H) 210, 212, and 214. Consequently, pin diodes 233, 242, and 255 are turned off with application of a reverse voltage, while pin diodes 237, 248, and 256 are turned on with application of a forward voltage. This causes all paths linking the input terminal 201 to the output terminals 204, 205, and 206 to open. Leakage signals passing through the parasitic capacitors of the pin diodes 233, 242, and 255 that are turned off are bypassed to the ground via the pin diodes 237, 248, and 256 that are turned on.

The functions of biasing and bypassing performed by the respective circuit elements such as a resistor, inductor, and capacitor are identical to those described in conjunction with FIG. 1B. No further description will be made. In this example, as mentioned above, two diode switches and bias and bypass elements are connected on each of the paths reaching the output terminals (1 to 4) 203 to 206. Thus, the output terminals can be controlled mutually independently for switching. Consequently, not only the SP4T but also a multi-branch switch configuration having a larger number of output terminals can be realized. In this embodiment, the number of parts is slightly larger than that of the circuitry shown in FIG. 1B. However, a sole power supply (+) developing a positive voltage is needed, though two power supplies (+/−) developing a positive voltage and negative voltage are needed in the circuitry shown in FIG. 1B.

However, similarly to the circuitry shown in FIG. 1B, when a high-output power amplifier is connected on an input state, there still arise such problems that (1) highly efficient isolation cannot be achieved because of the parasitic capacitances of the pin diodes 233, 242, and 255 which increase when the pin diodes are turned off, (2) a passage loss suffered by a signal during passage through the pin diode 228 that is turned off increases due to the parasitic capacitance of the pin diode, and (3) the parasitic capacitances of the diodes affect the distortion of a signal and the employment of two power supplies for developing positive and negative voltages respectively as control voltages is more effective in suppressing the distortion.

The present invention for solving the problems underlying the conventional circuits will be described below.

Figure 3:
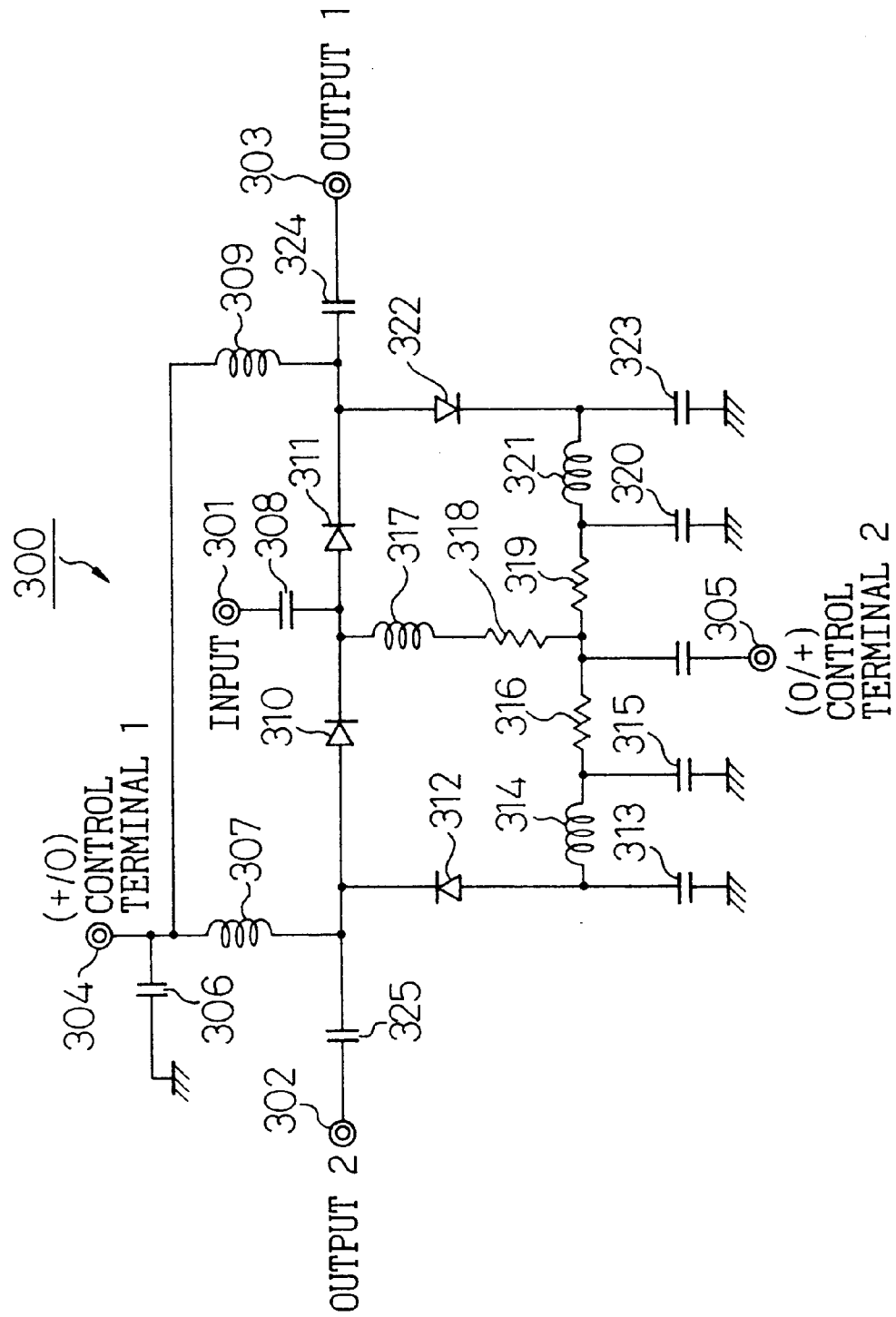
FIG. 3 is a diagram showing the first embodiment of a high-frequency switching circuit of the present invention.

FIG. 3 shows the first embodiment of a high-frequency switching circuit of the present invention.

The circuitry is characterized by an SPDT that can be realized more readily at lower cost. In the SPDT, a sole power supply is used despite the same number of parts as that in the circuitry shown in FIG. 1B, though the conventional circuitry shown in FIG. 1B includes two power supplies (+/−) for developing a positive voltage and negative voltage respectively.

FIG. 3 shows a situation in which a high-frequency signal input through an input terminal 301 is output through an output terminal (2) 302. In this case, a positive voltage (+) is applied to a control terminal (1) 304 and a ground voltage (0) is applied to a control terminal (2) 305. A switching control current (dc bias current) flows from the control terminal 304 into an inductor 307, a pin diode 310, an inductor 317, a resistor 318, and the ground terminal of the control terminal 305. Another switching control current flows from the control terminal 304 into an inductor 309, a pin diode 322, an inductor 321, a resistor 319, and the control terminal 305.

As a result, a low impedance is produced between the anode and cathode of the forward-biased pin diode 310. The path linking the input terminal 301 and output terminal (2) 302 becomes conducting. Moreover, due to the conduction of the pin diode 322, an output terminal (1) 303 is grounded via a capacitor 323 to provide a return path for an alternating current. By contrast, the pin diodes 311 and 312 are turned off by a reverse bias. A leakage signal appearing on the path reaching the output terminal (1) 303, due to the parasitic capacitance of the pin diode 311 which has increased when the pin diode is open, is bypassed to ground via the conducting pin diode 322 and capacitor 323. The efficiency of isolation between the output terminal (1) 303 and output terminal (2) 302 improves. Moreover, the pin diode 312 becomes open, thus preventing a load loss suffered by a signal output through the output terminal (2) 302.

When a ground voltage (0) is applied to the control terminal (1) 304 and a positive voltage (+) is applied to the control terminal (2) 305, the pin diodes 311 and 312 are turned on and the pin diodes 310 and 322 are turned off. In this case, a switching control current flows from the control terminal (2) 305 into the resistor 318, inductor 317, pin diode 311, inductor 309, and ground terminal of the control terminal (1) 304. Another switching control current flows from the control terminal 305 into the resistor 316, inductor 314, pin diode 312, inductor 307, and control terminal 304. In this embodiment, the inductors 307, 309, 314, 317, and 321 fulfill a choking function for separating a dc line from a high-frequency signal line, the capacitors 308, 324, and 325 fulfill a dc blocking function, and the other capacitors fulfill a bypassing function for removing high-frequency noise. Furthermore, since a reverse bias is applied via the resistors and inductors, distortion is suppressed despite the circuitry including a sole power supply.

Figure 4:
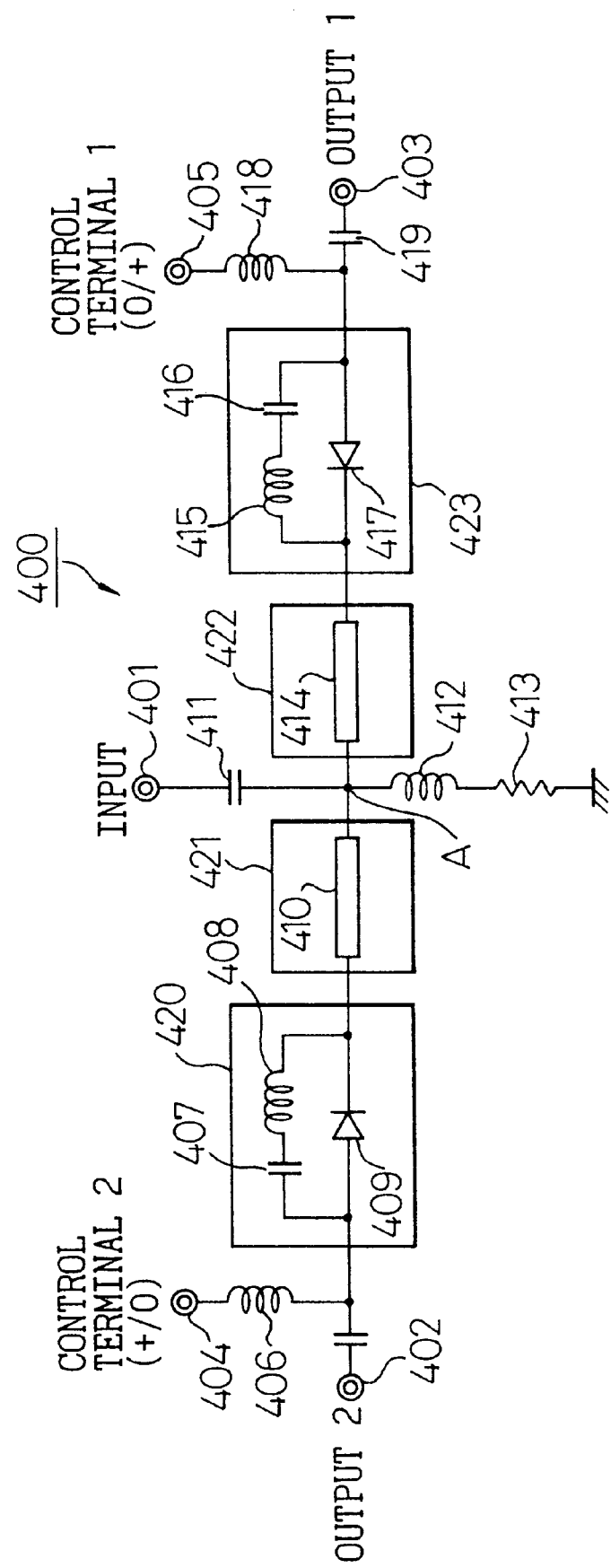
FIG. 4 is a diagram showing the second embodiment of a high-frequency switching circuit of the present invention.

FIG. 4 shows the second embodiment of a high-frequency switching circuit of the present invention.

In this circuitry, two pin diodes included in the circuitry of an SPDT shown in FIG. 1b are excluded and a sole power supply is employed.

In FIG. 4, striplines 410 and 414 are connected in series with pin diodes 409 and 417 respectively. A capacitor 407 and inductor 408 connected in series with each other and a capacitor 416 and inductor 415 connected in series with each other are connected in parallel with the pin diodes 409 and 417 respectively.

This embodiment will, similarly to the embodiment shown in FIG. 3, be described on the assumption that a high-frequency signal input through an input terminal 401 is output through an output terminal (2) 402. In this case, a ground voltage (0) is applied to a control terminal (1) 405, and a positive voltage (+) is applied to a control terminal (2)

404. This causes a switching control current to flow from the control terminal 404 into an inductor 406, pin diode 409, stripline 410, inductor 412, resistor 413, and ground. The pin diode 409 is turned on and the path linking the input terminal 401 and output terminal (2) 402 becomes conducting. The inductors 406, 412, and 418 are choke coils for producing a high impedance at a high frequency.

On the contrary, a ground voltage (0) is applied to a control terminal (1). A pin diode 417 is turned off, that is, produces a high impedance. However, as mentioned above, when a diode is off, the parasitic capacitance of the diode gets larger. It becomes difficult for the pin diode 417 alone to produce a high impedance at a high frequency. In this embodiment, the capacitance and inductance produced by a capacitor 416 and inductor 415 connected in parallel to the pin diode 417 in a resonant unit 423 are adjusted. A parallel resonance is attained between the capacitor and inductor and a parasitic capacitor, of which the capacitance has increased when the pin diode 417 is turned off, in the frequency band of the signal. Thus, a high impedance is produced at a high frequency.

Furthermore, a phase adjustment unit 422 uses a stripline 414 connected in series with the pin diode 417 to adjust the phase of a voltage across a path from a branch point A in FIG. 4 to an output terminal (1) 403 so that the pin diode 417 becomes open for a high-frequency current. With a switching control current flowing from the control terminal 404 to a resistor 413, a dc bias voltage at the point A increases to be applied as a reverse bias voltage to the pin diode 417. This causes the pin diode 417 to produce a high impedance. The efficiency of isolation of a high-frequency signal line improves.

FIGS. 5A and 5B and FIGS. 6A and 6B show the results of simulation of the operations of the high-frequency switching circuit shown in FIG. 4.

Figure 5A:
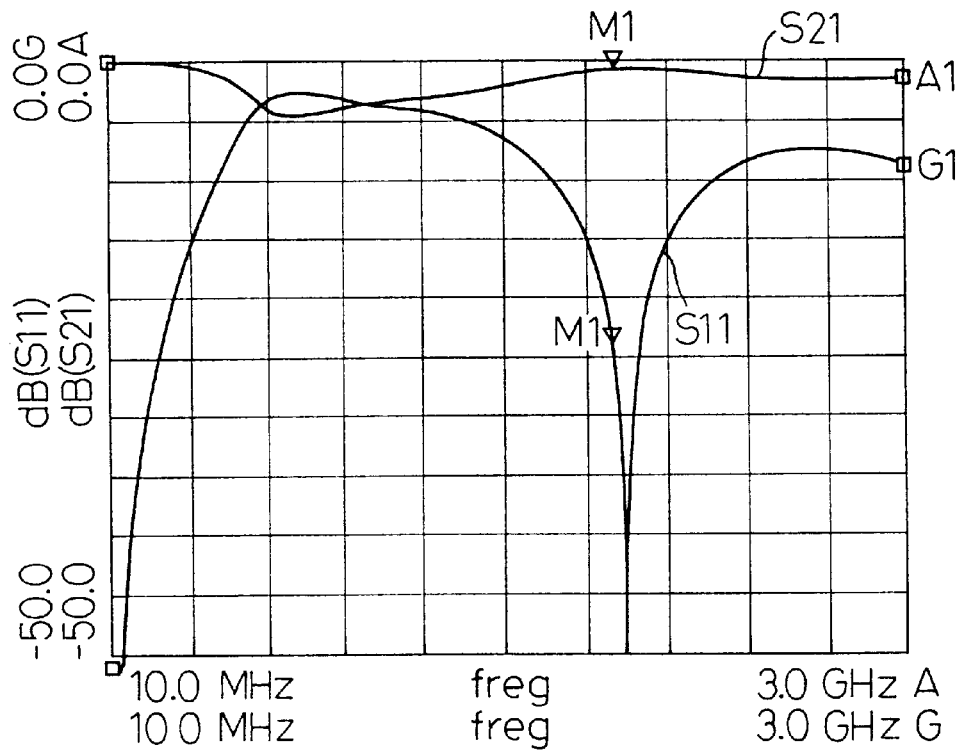
Figure 5B:
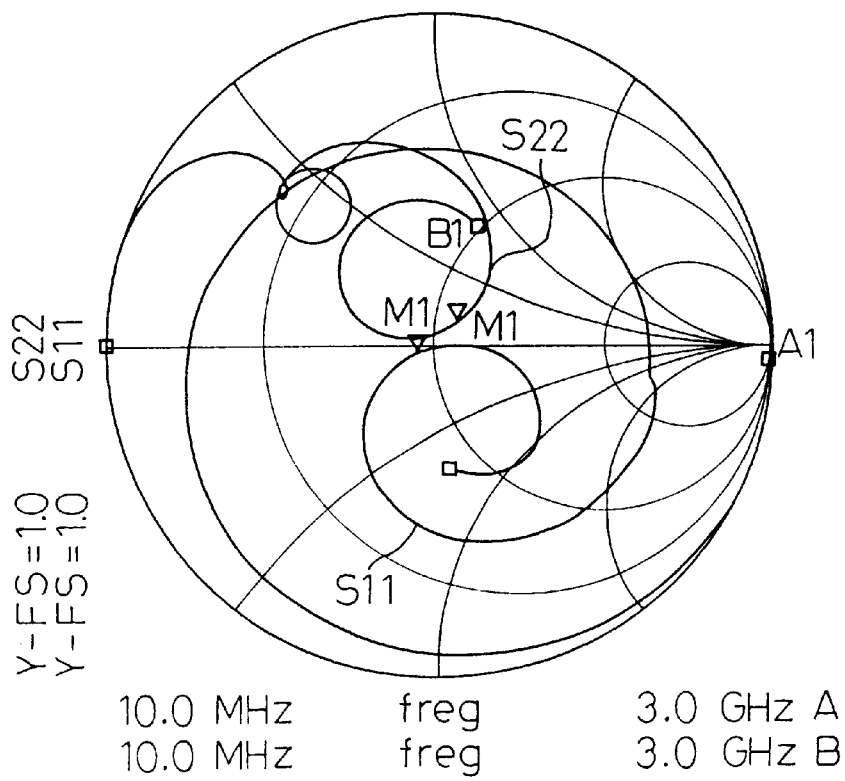
Figure 6A:
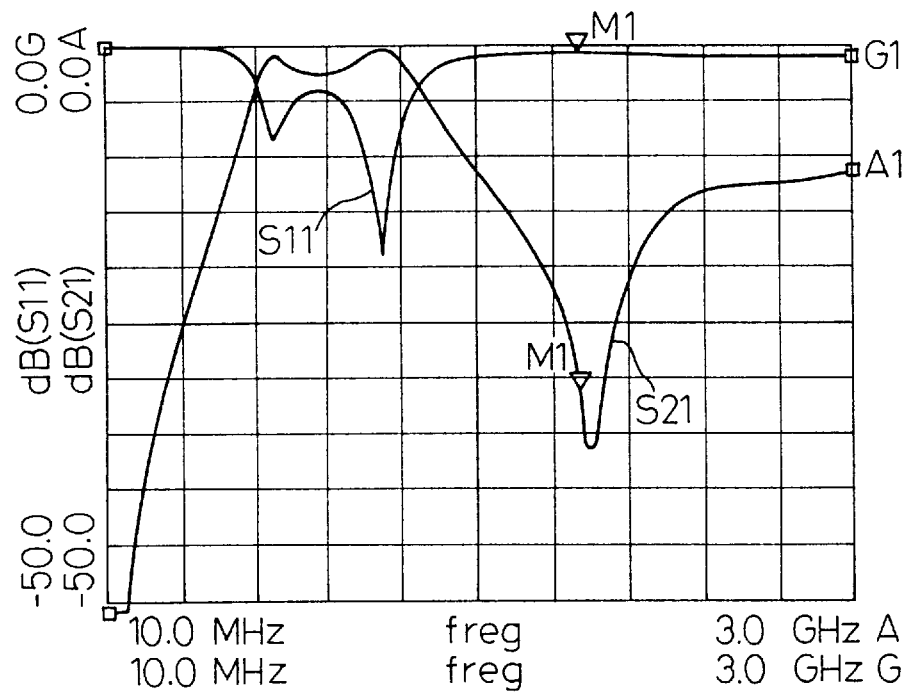
FIG. 6A is a diagram showing the results of simulation concerning the frequency transfer/passage characteristic and reflection characteristic of the circuit shown in FIG. 4 which is off.
Figure 6B:
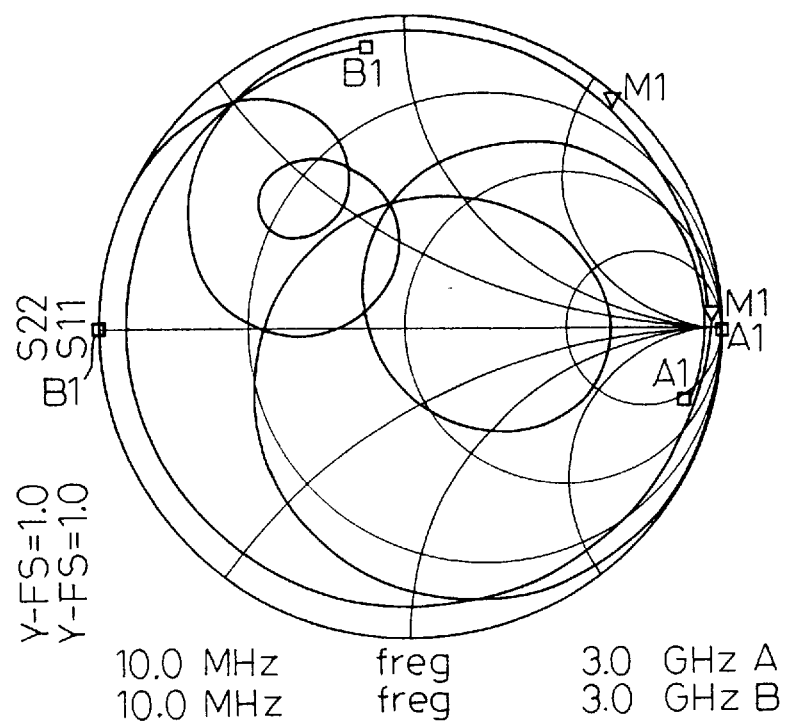
FIG. 6B is a Smith chart showing the input and output reflection characteristics of the circuit shown in FIG. 4 which is off.

FIGS. 5A and 5B show the results of simulation performed when the high-frequency switching circuit shown in FIG. 4 is on. FIGS. 6A and 6B show the results of simulation performed when the high-frequency switching circuit is off. As a pin diode employed in the simulation, S parameters, which will be duly apparent, detected in an actual device are used. A marker (M1) in the graphs indicates 1906 MHz that is a center frequency of a transmitted or received signal for telephony using personal handy phones.

FIG. 5A shows data of a transfer/passage characteristic (S21) and reflection characteristic (S11: return loss) of the path linking the branch point A and output terminal (1), which is obtained when the pin diode 409 for closing the path reaching the output terminal (2) beyond the branch point A is off and the pin diode 417 for closing the path reaching the output terminal (1) is on (when a signal passes through the path), in relation to frequencies. The Smith chart of FIG. 5B indicates input and output reflection characteristics (S11 and S22).

As apparent from FIG. 5A, the results of the simulation are satisfactory. Specifically, the passage loss suffered by a signal during passage through the pin diode that is on (insertion loss: S21) is approximately 0.5 dB and the return loss (reflection characteristic: S11) is 20 dB or more. As for the results of simulation performed when the high-frequency switching circuit is off or in a state opposite to the state relevant to FIGS. 5A and 5B (when a signal decays), FIG. 6A shows that the insertion loss (S21) is 30 dB or more and thus implies that the efficiency of isolation is high. The Smith chart of FIG. 6B implies that the reflection characteristic of the path beyond the branch point A is excellent (total reflection).

Figure 7:
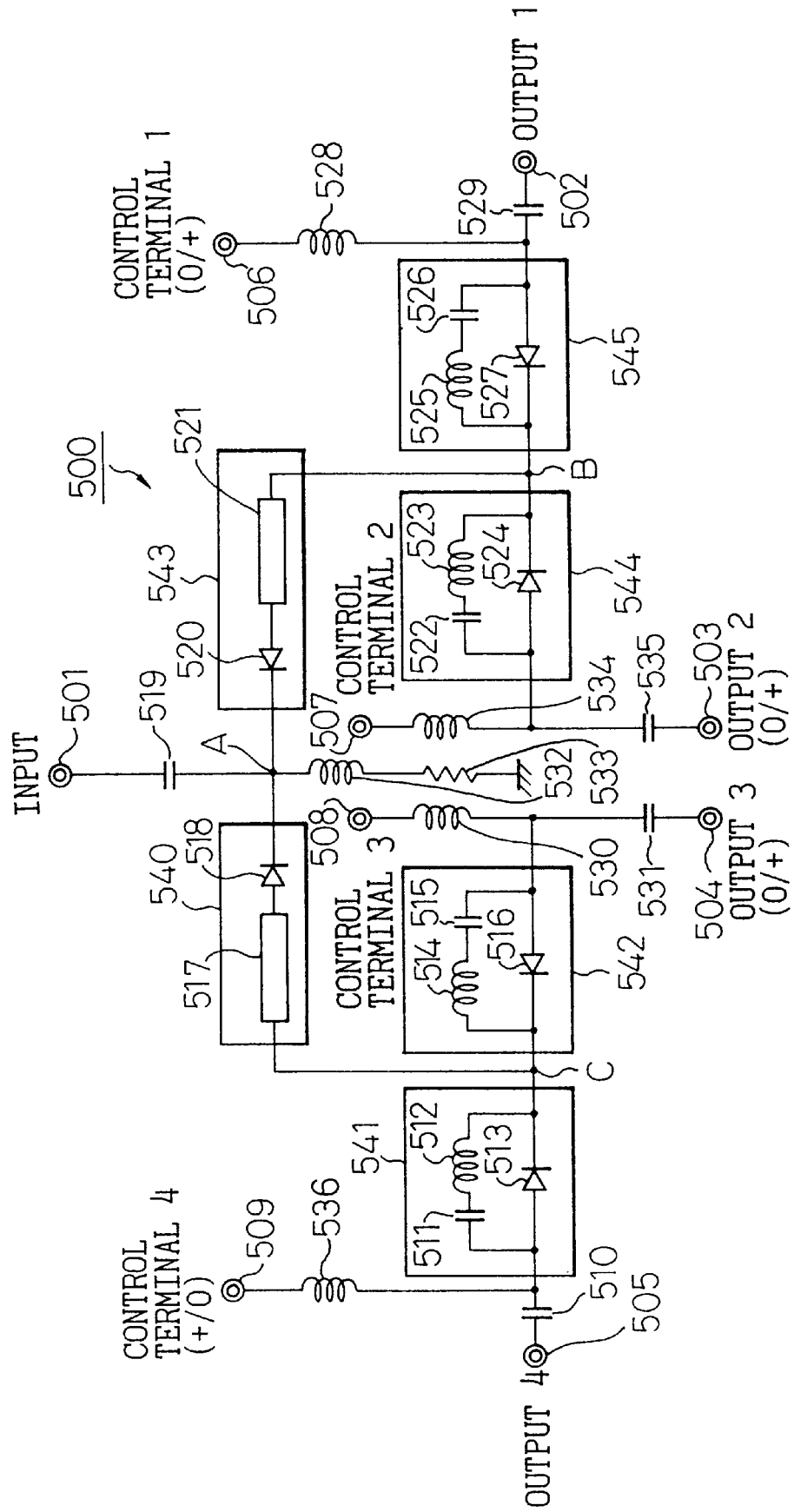
FIG. 7 is a diagram showing the third embodiment of a high-frequency switching circuit of the present invention.

FIG. 7 shows the third embodiment of a high-frequency switching circuit of the present invention.

In this embodiment, an SP4T like the one shown in FIG. 2B is constructed by applying the circuitry of the SPDT shown in FIG. 7. The circuitry can be adapted not only to the SP4T but also to a multi-branch switching circuit as it is.

This embodiment may be regarded in such a way that an SP4T is constructed to newly include resonant circuits connected to output terminals in addition to the resonant circuits 420 and 423 that are shown in FIG. 4 to be connected to the left and right output terminals, or that an SP4T is constructed to include two pairs of the left and right resonant circuits 420 and 423 each pair of which are connected to a common stripline composed of the left and right striplines shown in FIG. 4. The operations of the circuit elements are identical to those described in conjunction with FIG. 4.

A description will made of a situation in which a high-frequency signal input through an input terminal 501 is output through an output terminal (4) 505. In this case, a positive voltage (+) is applied to a control terminal (4) 509 alone, and a ground voltage (0) is applied to the other control terminals (1, 2, and 3) 506, 534, and 430. A switching control current flows from the control terminal (4) 509 through an inductor 536, pin diode 513, stripline 517, pin diode 518, inductor 532, and resistor 533 into the ground. As a result, the pin diode 513 is turned on. This causes the path linking the input terminal 501 and output terminal (4) 505 to conduct.

Pin diodes 527, 524, and 516 for closing paths reaching output terminals (1, 2, and 3) 502, 503, and 504 are all turned off by a reverse bias voltage developed at a resistor 533 due to the application of the ground voltage and the inflow of the switching control current from the control terminal (4) 509. In this state, as far as the path reaching the output terminal (1) 502 beyond the branch point A is concerned, the pin diodes 520 and 527 are turned off and produce a high impedance.

As described in conjunction with FIG. 4, a capacitor 526 and inductor 525 are connected in parallel with the pin diode 527 so that a high impedance can be produced at a high frequency. Furthermore, a stripline 521 and pin diode 520 are connected in series with each other. By adjusting the length of the stripline 521, the path from the branch point A to the output terminal (1) 502 opens for blocking the flow of a high-frequency current. With the addition of the diode 520, the length of the stripline 521 can be made shorter than the one in FIG. 4. Consequently, the circuit scale can be made more compact.

Compared with the conventional circuitry shown in FIG. 2B, control is simplified due to the common use of a control current flowing into the pin diodes. The pin diode that is off is open for a large-power high-frequency signal on the path beyond the branch point A. The distortion of a signal caused by the diode 520 can therefore be reduced. The pin diode 516 that is off and opposed to the conducting pin diode 513 is open for the large-power high-frequency signal on a path beyond a branch point C. The distortion of a signal caused by the pin diode 516 can therefore be reduced.

Figure 8A:
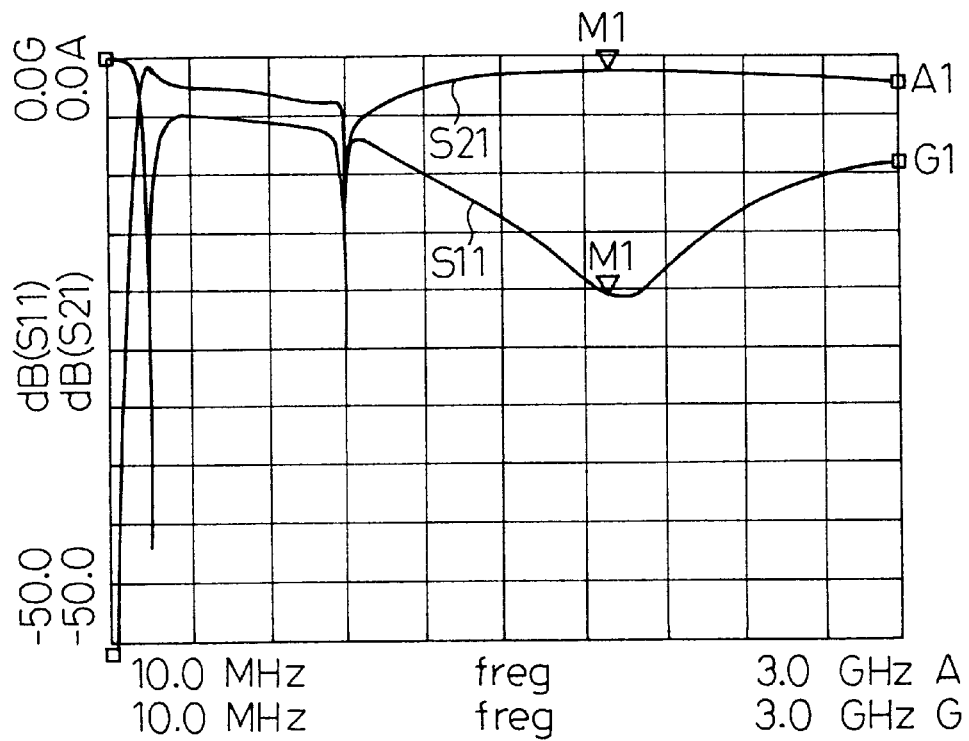
Figure 8B:
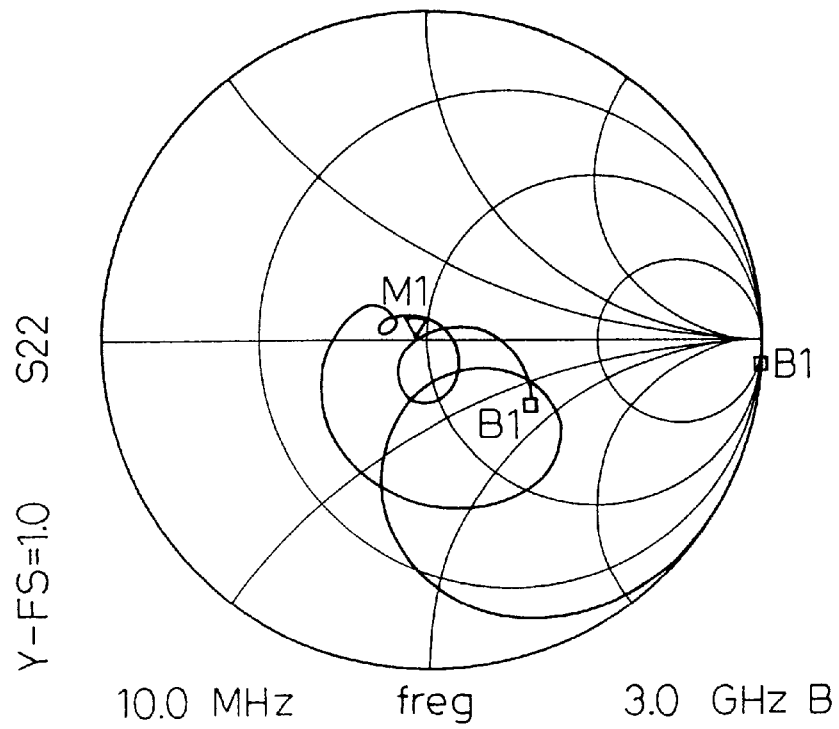
Figure 9A:
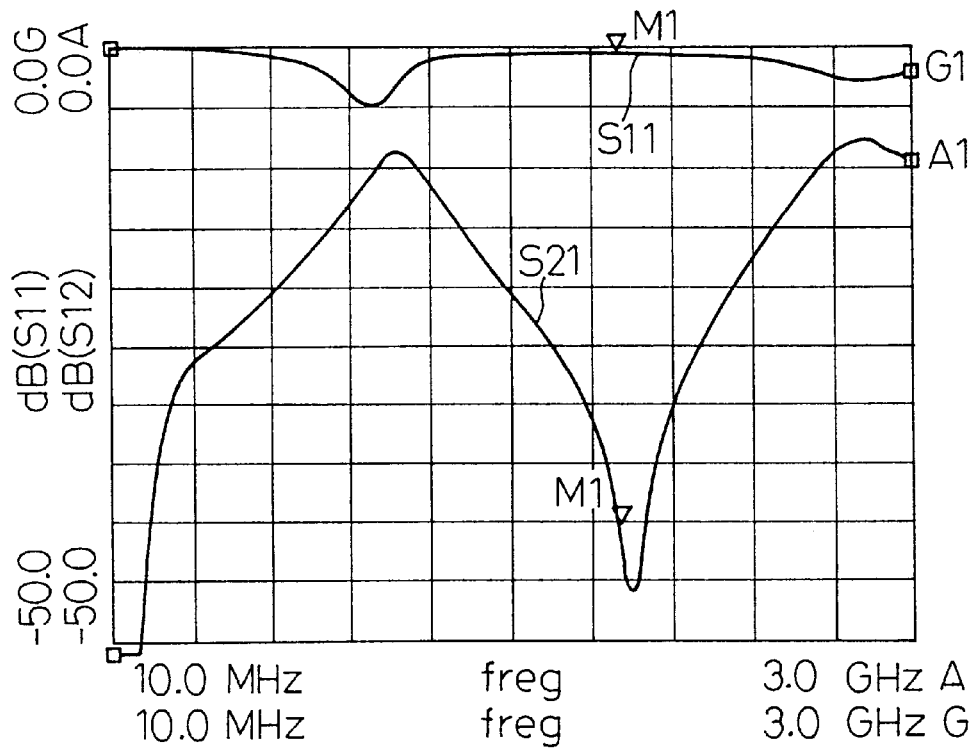
FIG. 9A is a diagram showing the results of simulation concerning the frequency transfer/passage characteristic and reflection characteristic of the circuit shown in FIG. 7 which is off.
Figure 9B:
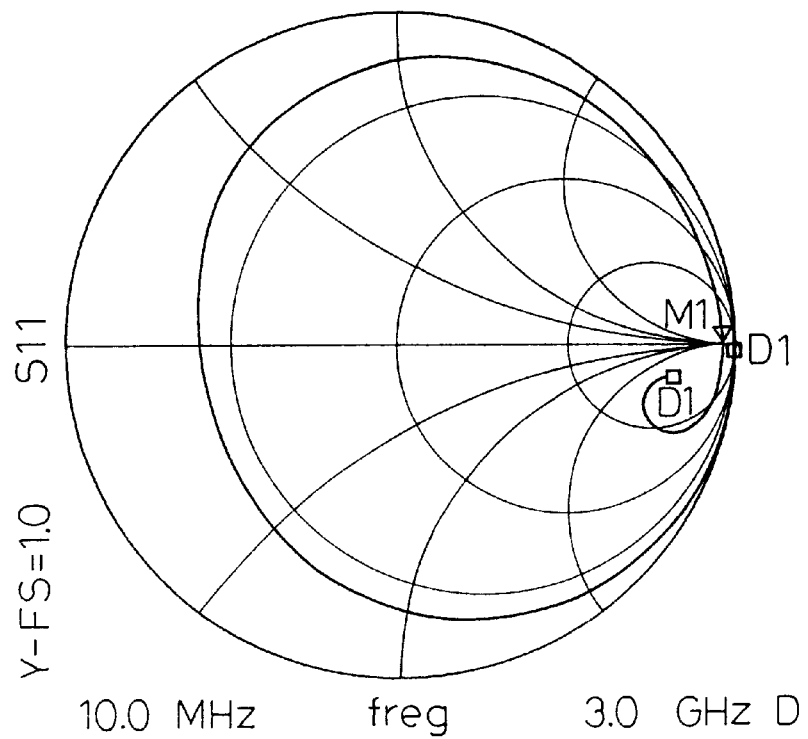
FIG. 9B is a Smith chart showing the input and output reflection characteristics of the circuit shown in FIG. 7 which is off.

FIGS. 8A and 8B and FIGS. 9A and 9B show the results of simulation of the operations of the high-frequency switching circuit shown in FIG. 7. FIGS. 8A and 8B show the results of simulation performed when the high-frequency switching circuit shown in FIG. 7 is on, and FIGS. 9A and 9B show the results of simulation performed when the high-frequency switching circuit is off.

FIG. 8A shows data of a transfer/passage characteristic (S21) and reflection characteristic (S11: return loss) of the pass between the branch point A and output terminal (1) in FIG. 7, which is obtained when the pin diodes for closing the paths reaching the output terminals (2 to 4) are off and the pin diode for closing the path reaching the output terminal (1) is on (when a signal passes through the path), in relation to frequency. The Smith chart of FIG. 8B indicates input and output reflection characteristics (S11 and S22).

FIG. 8A implies that the results of simulation are satisfactory. Specifically, the passage loss suffered by a signal during passage through the pin diode that is on (insertion loss: S21) is as small as 1 dB or less, and the return loss (reflection characteristic: S11) is 20 dB or more. As for the results of simulation performed when the high-frequency switching circuit is off (a signal decays), FIG. 9A shows that the insertion loss (S21) is 40 dB or more and thus implies that the efficiency of isolation is high. The Smith chart of FIG. 9B implies that the reflection characteristic of the path beyond the branch point A is satisfactory (total reflection).

Figure 10:
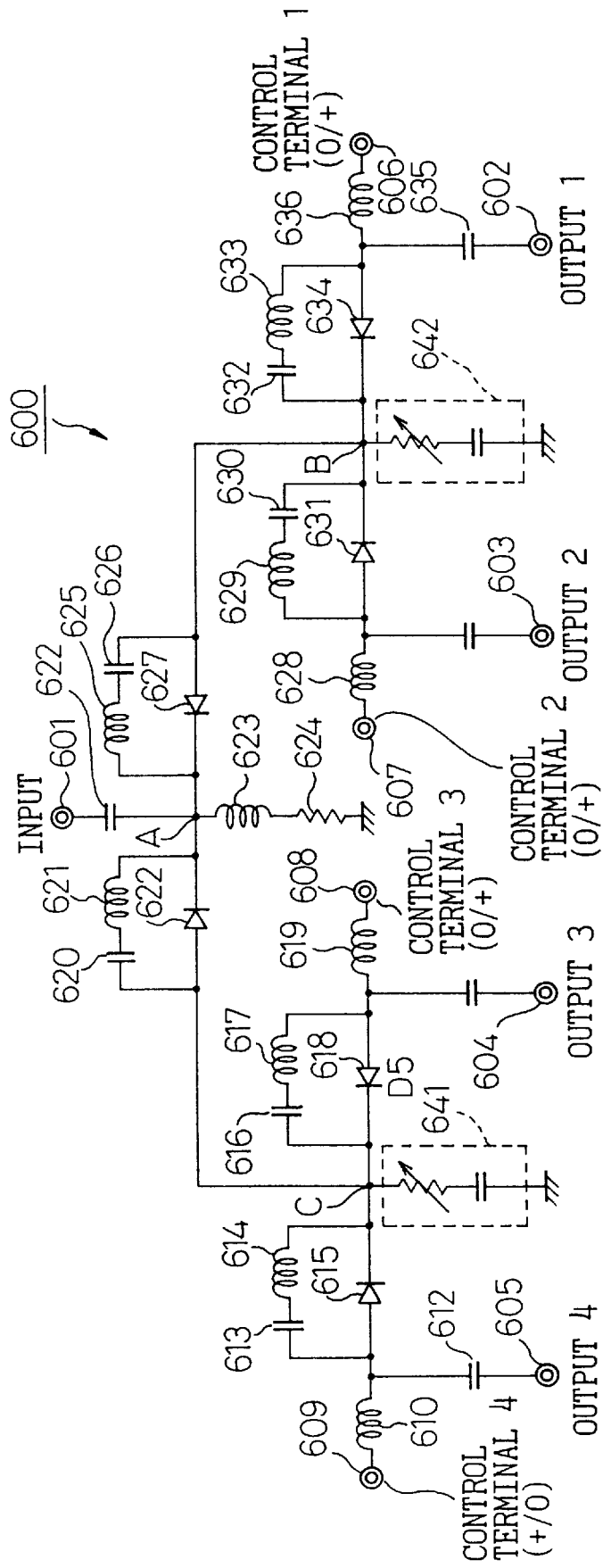
FIG. 10 is a diagram showing the fourth embodiment of a high-frequency switching circuit of the present invention.

FIG. 10 shows the fourth embodiment of a high-frequency switching circuit of the present invention. This embodiment is a variant of the SP4T shown in FIG. 7.

In this embodiment, the striplines included in the embodiment shown in FIG. 7 are excluded. A capacitor 620 and inductor 621 connected in series with each other and a capacitor 626 and inductor 625 connected in series with each other are connected in parallel with pin diodes 622 and 627 respectively in place of the striplines. In this embodiment, termination circuits 641 and 642 each composed of a variable resistor and capacitor are added to a branch point C between pin diodes 615 and 618 and a branch point B between pin diodes 631 and 634. The operations of the circuit of this embodiment are identical to those shown in FIG. 7.

Now, assume that the path linking an input terminal 601 and output terminal (4) 609 is conducting and the other paths are noncoducting. When the branch point B is open for a high-frequency current, an impedance on a path beyond the point B is 50 ohms owing to the addition of the termination circuit 642. The capacitor 626 and inductor 625 connected in parallel with the pin diode 627 work to adjust the impedance, so that the pin diode 627 is open for a high-frequency current flowing through a path beyond the branch point A. On the contrary, the conducting termination circuit 641 on the side of the output terminal (4) 609 produces a high impedance and is open for a high-frequency signal.

Figure 11A:
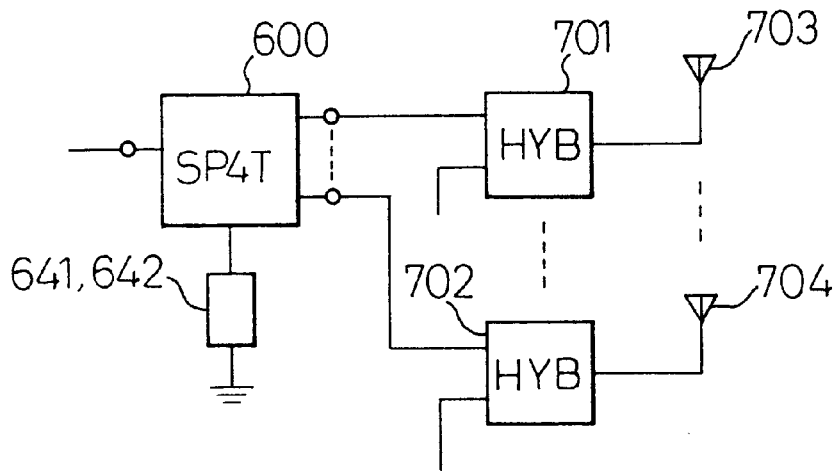
FIG. 11A is a diagram showing an example of a single-pole four-throw including an example of a termination circuit shown in FIG. 10.
Figure 11B:
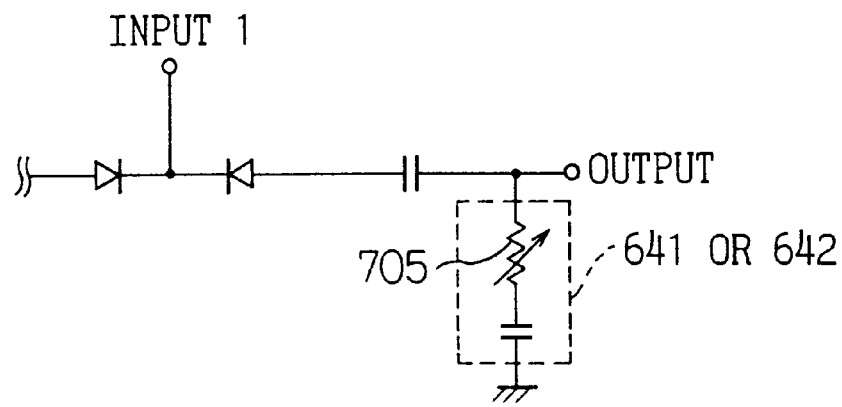
FIG. 11B is a diagram showing an example (1) of the termination circuit.
Figure 11C:
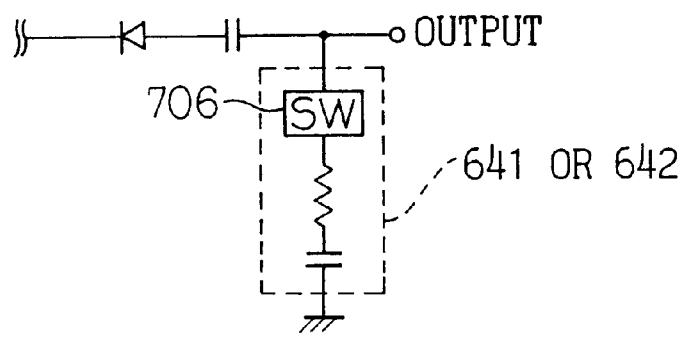
FIG. 11C is a diagram showing an example (2) of the termination circuit.

FIGS. 11A to 11C show examples of the circuitry of the termination circuit shown in FIG. 10.

FIG. 11A is a block diagram showing a use example of an SP4T 600 including the termination circuits 614 and 641 shown in FIG. 10. Hybrid circuits 701 and 702 that are termination facilities are connected to antennas 703 and 704. FIGS. 11B and 11C show examples of the circuitries of the termination circuits 641 and 642. The former is designed to change an impedance using a varactor diode resistor 705 (50 ohms or higher impedance). When a pin diode is off (producing a high impedance), an impedance on a path reaching an output terminal is set to 50 ohms. Thus, the impedance produced by a pin diode, which is off, on the path reaching the output terminal can be optimized. The latter is designed to control the opening or closing of a terminal resistor having 50 ohms using a switching circuit 706 that is, for example, a transistor switch. When a pin diode is off, a fixed resistor is connected. Thus, an impedance on a path reaching an output terminal is kept optimal.

As described so far, according to the present invention, a high-frequency switch characterized by the circuitry capable of withstanding high output power and suppressing distortion can be realized. Specifically, phase adjustment involving a pin diode and stripline and phase adjustment performed by an inductor connected in parallel with a capacitor and pin diode are carried out. A pin diode that is off is open for a high-frequency current. Thus, a high-frequency switching circuit capable of suppressing distortion and achieving highly efficient isolation can be realized. Furthermore, the circuitry including a sole power supply can be realized as far as a reverse bias can be provided.

What is claimed is:

1. A high-frequency switching circuit having an input terminal through which a high-frequency signal is input and an output terminal through which the input high-frequency signal is output, comprising:

a diode resonant circuit including a diode and a resonant circuit, the diode being provided with the high-frequency signal from the input terminal through an cathode thereof and providing the high-frequency signal to the output terminal through an anode thereof, and the resonant circuit attaining a parallel resonance owing to a parasitic capacitance interposed between the anode and cathode formed when the diode is off;

a control terminal to which a switching control voltage is applied, the switching control voltage producing a switching control current for switching the diode;

a first bias circuit for providing a switching-bias of the diode in a manner of separating the switching control current from the high-frequency signal; and a second bias circuit for providing a switching-bias of the diode by therethrough causing the switching control current provided from the cathode of the diode to flow to ground in a manner of separating the switching control current from the high-frequency signal.

2. A high-frequency switching circuit according to claim 1, wherein a plurality of high-frequency switching circuits are included, said second bias circuit is shared by said plurality of high-frequency switching circuits, and thus a multi-point switching circuit configuration is realized.

3. A high-frequency switching circuit according to claim 2, wherein said second bias circuit applies a bias voltage induced by the switching control current as a reverse bias voltage to the cathode of the diode included in said diode resonant circuit.

4. A high-frequency switching circuit according to claim 1, wherein a phase adjustment circuit for compensating for a phase difference so that the path reaching said output terminal opens for the high-frequency signal when said diode is off is interposed between said input terminal and the cathode of the diode included in said diode resonant circuit.

5. A high-frequency switching circuit according to claim 4, wherein said second bias circuit applies a bias voltage induced by the switching control current as a reverse bias voltage to the path between said input terminal and phase adjustment circuit.

6. A high-frequency switching circuit according to claim 4, wherein said phase adjustment circuit is connected to said input terminal via a phase adjustment diode.

7. A high-frequency switching circuit according to claim 6, wherein said second bias circuit applies a bias voltage induced by the switching control current as a reverse bias voltage to the path between said input terminal and phase adjustment diode.

8. A high-frequency switching circuit according to claim 1, wherein said control terminal to which the switching control voltage inducing the switching control current to be supplied to the anode of the diode included in said diode resonant circuit is applied, said first bias circuit, and said output terminal are replaced with a plurality of high-frequency switching/branching devices each comprising: a control terminal portion to which a switching control voltage or ground voltage developed at one power supply is applied; a diode resonant circuit portion including a diode that applies a signal to said output terminal through an anode thereof and a signal to the anode of said diode included in said diode resonant circuit through a cathode thereof, and having a resonant circuit, which attains a parallel resonance owing to a parasitic capacitance formed when said diode is off in the frequency band of the high-frequency signal, interposed between the anode and cathode of said diode; and a first bias circuit portion for separating a switching control current stemming from the switching control voltage applied to said control terminal portion and supplying the switching control current to the anode of said diode, and wherein a multi-branch switch configuration is thus realized.

9. A high-frequency switching circuit according to claim 8, wherein a plurality of high-frequency switching circuits are included, said second bias circuit is shared by said plurality of high-frequency switching circuits, and thus a multi-branch switching circuit configuration is realized.

10. A high-frequency switching circuit according to claim 9, wherein said second bias circuit applies a bias voltage induced by the switching control current as a reverse bias voltage to the cathode of the diode included in said diode resonant circuit.

11. A high-frequency switching circuit according to claim 8, further comprising a termination circuit connected to the anode of the diode included in said diode resonant circuit and shared by said high-frequency switching/branching devices.

12. A high-frequency switching circuit according to claim 11, wherein a plurality of high-frequency switching circuits are included, said second bias circuit is shared by said plurality of high-frequency switching circuits, and thus a multi-branch switching circuit configuration is realized.

13. A high-frequency switching circuit according to claim 12, wherein said second bias circuit applies a bias voltage induced by the switching control current as a reverse bias voltage to the cathode of the diode included in said diode resonant circuit.

14. A high-frequency switching circuit according to claim 8, wherein a phase adjustment circuit for compensating for a phase difference so that the path reaching said output terminal opens for the high-frequency signal when said diode is off is interposed between said input terminal and the cathode of the diode included in said diode resonant circuit.

15. A high-frequency switching circuit according to claim 14, wherein said second bias circuit applies a bias voltage induced by the switching control current as a reverse bias voltage to the path between said input terminal and a phase adjustment circuit.

16. A high-frequency switching circuit according to claim 14, wherein said phase adjustment circuit is connected to said input terminal via a phase adjustment diode.

17. A high-frequency switching circuit according to claim 16, wherein said second bias circuit applies a bias voltage induced by the switching control current as a reverse bias voltage to the path between said input terminal and a phase adjustment diode.

18. A high-frequency switching circuit of a single-pole double-throw type having one input terminal through which a high-frequency signal is input and, first and second output terminals through either of which the high-frequency signal is output, comprising:

a first diode having the high-frequency signal input to the input terminal applied to an anode thereof and applying the high-frequency signal to the first output terminal through a cathode thereof;

a second diode having the high-frequency signal input to the input terminal applied to a cathode thereof and applying the high-frequency signal to the second output terminal through an anode thereof;

a third diode having an anode thereof connected to the cathode of the first diode;

a fourth diode having a cathode thereof connected to the anode of the second diode;

a first control terminal to which a first switching control voltage is applied, the first switching control voltage producing a switching control current for switching the diodes;

a second control terminal to which a second switching control voltage opposite in polarity to the first voltage is applied, the second switching control voltage producing the switching control current in cooperation with the first switching control voltage;

a first bias circuit for providing switching-biases of the diodes by therethrough providing the switching control current to the cathode of the first diode and the anode of the second diode in a matter of separating the switching control current from the high-frequency signal; and a second bias circuit for providing switching-biases of the diodes by therethrough providing the switching control current to the cathode of the third diode, the anode of the fourth diode, the anode of the first diode, and the cathode of the second diode, in a manner of separating the switching control current from the high-frequency signal.

* * * * *